(12) United States Patent
Herb

(10) Patent No.: US 7,073,995 B2
(45) Date of Patent: Jul. 11, 2006

(54) ATTACHMENT SYSTEM

(75) Inventor: Armin Herb, Apfeldorf (DE)

(73) Assignee: Hilti Aktiengesellschaft, Schaan (LI)

( * ) Notice: Subject to any disclaimer, the term of this patent is extended or adjusted under 35 U.S.C. 154(b) by 30 days.

(21) Appl. No.: 10/728,253

(22) Filed: Dec. 4, 2003

(65) Prior Publication Data
US 2004/0165947 A1   Aug. 26, 2004

(30) Foreign Application Priority Data
Dec. 5, 2002   (DE) ............................... 102 56 858

(51) Int. Cl.
*F16B 39/32* (2006.01)
(52) U.S. Cl. .................... 411/85; 411/89; 411/104; 411/114; 411/124; 411/127; 411/138
(58) Field of Classification Search ............. 411/85, 411/87, 89, 104, 114, 116, 124, 125, 126, 411/127, 138; 16/DIG. 37; 403/374.3; 238/315, 238/316
See application file for complete search history.

(56) References Cited

U.S. PATENT DOCUMENTS

| 831,747 | A | * | 9/1906 | Russell | 411/138 |
| 1,181,494 | A | * | 5/1916 | Warren et al. | 411/114 |
| 1,956,846 | A | * | 5/1934 | Williams | 411/138 |
| 4,410,298 | A | * | 10/1983 | Kowalski | 411/112 |
| 4,666,355 | A | * | 5/1987 | Stover | 411/85 |
| 4,784,552 | A | * | 11/1988 | Rebentisch | 411/85 |
| 5,067,863 | A | * | 11/1991 | Kowalski | 411/85 |
| 5,209,619 | A | * | 5/1993 | Rinderer | 411/85 |
| 5,271,586 | A | * | 12/1993 | Schmidt | 248/58 |

* cited by examiner

Primary Examiner—Gary S. Hartmann
(74) Attorney, Agent, or Firm—Abelman, Frayne & Schwab

(57) ABSTRACT

An attachment system, which is to be introduced in a mounting opening (5) of a hollow body (3), includes a rear engagement member (4) for engaging from behind holding projection (17.1, 17.2) of the hollow body (3), at least one stop (6, 37) for engaging edges of outer sides of the hollow body which limit the mounting opening (5) and connected with the rear engagement member (4) by a screw, and a device providing for a relative rotational movement between the stop (6) and the rear engagement member (4) about an axis of the fastening means (7; 35) and formed as a transformation device (9; 31) for converting a translational movement of the screw (7; 35) relative to the stop (6) in a rotational movement of the rear engagement member (4) relative to the stop.

5 Claims, 5 Drawing Sheets

ATTACHMENT SYSTEM

BACKGROUND OF THE INVENTION

1. Field of the Invention

The present invention relates to an attachment system to be introduced in a mounting opening of a hollow body and, in particular, in a mounting opening of a C-shaped mounting rail, and including a rear engagement member for engaging from behind the holding projection of the hollow body, at least one stop for engaging edges of outer sides of the hollow body which limit the mounting opening, fastening means for connecting the stop with the rear engagement member, and a device providing for a relative rotational movement between the stop and the rear engagement member about an axis of the fastening means.

2. Description of the Prior Art

Attachment systems of the type described above are used for securing objects, e.g., on C-shaped mounting rail attachable, e.g., to a constructional component. The attachment system is introduced in the mounting opening of the mounting rail and is pivoted by an angle of, e.g., 90°. Thereby, the rear engagement member of the attachment system engages from behind holding projections provided on the mounting rail. In this pre-fixation position, it is possible to displace the attachment system its end position on the mounting rail. In order to effect attachment of the system on the mounting rail, the rear engagement member is secured to a stop, e.g., with a threaded rod, whereby it becomes clamped to the holding projections of the mounting rail. The attachment system of this type are suitable for securing elongate objects and conduits such as tubular conduits and the like. An attachment system of this type is disclosed, e.g., in German Publication DE-197 36 933 A1.

For securing an elongate conduit or object a hollow body, a plurality of attachment systems needs to be used. In order to accelerate the process of setting of separate attachment systems and to insure a perfect alignment of the rear engagement member of each attachment system, the German Patent DE-196 17 750C1 discloses use of an anchoring unit. The anchoring unit includes a tension pull-back spring provided between the stop and the rear engagement member connected with the stop and rotatable relative to the stop. The tension pull-back spring generates a pull-back or return force when the two parts rotate relative to each other. The stop is provided with rotation-limited stop elements. As soon as the rear engagement member is located, upon actuation of the anchoring unit, in the interior of the hollow body, the return force of the pulls back or return spring aligns the rear engagement member with the edges of the hollow body so that the rear engagement member can engage from behind the holding elements of the hollow body.

The drawback of the system of DE-196 17 750 C consists in that the anchoring unit should be pivoted by a predetermined angle after the attachment system, the rear engagement member, has been introduced in the mounting opening of the mounting rail in order for the rear engagement member optimally engage the holding projections. With locations which are difficult to access, this is disadvantageous during mounting of the system.

An object of the present invention is to provide an attachment system with a rotatable rear engagement member which would enable pre-fixation of the system on a hollow body without a need to rotate the system by a predetermined angle for correct positioning of the rear engagement member with respect to the holding projections.

Another object of the present invention is to provide an attachment system which can be economically produced and easily mounted or set.

SUMMARY OF THE INVENTION

These and other objects of the present invention, which will become apparent hereinafter, are achieved by providing an attachment system designed to be introduced in a mounting opening of a hollow body having holding projections. The attachment system comprise a real engagement member for engaging from behind the holding projection and at least one stop for engaging edges of outer sides of the hollow body which limit the mounting opening. The stop is connected with the rear engagement member by fastening means. There is further provided a device for inducing a relative rotational movement between the stop and the rear engagement member about an axis of the fastening means. The relative rotation-providing device is formed as a transformation device for converting a translational movement of the fastening means relative to the stop in a rotational movement of the rear engagement member relative to the stop.

The transformation device insures that the pressure applied to the fastening means for displacing the attachment system through the mounting opening of the hollow body is sufficient for pre-fixing of the attachment system on the hollow body. The transformation system determines the degree of conversion of the translational movement in the rotational movement. The degree of the conversion determines the amount of rotation of the rear engagement member relative to the mounting opening necessary for the alignment of the rear engagement member relative to the holding projections. The transformation device provides an insurance to the user that the rear engagement member is correctly aligned relative to the holding projections. There is no need for the user to manually rotate the stop or the fastening means. This permits to use the invention attachment system in locations which are accessible only with much difficulty. The pre-fixed attachment system is subsequently locked on the hollow body or released with the fastening means. When the inventive attachment system is arranged in a mounting opening or a mounting opening of a C-shaped mounting rail, the attachment system, after being pre-fixed, can be subsequently released and be displaced along the axis of the hollow body by application of pressure to the fastening means. The attachment system is secured or locked in its predetermined position on the hollow body with the fastening means.

Advantageously, the transformation device comprises an annular element fixedly connected with the stop without possibility of rotation relative thereto. The annular element includes a resilient actuator pivotable in a rotational direction with respect to the fastening means. The actuator has at its free end, locking means engageable in matching locking means provided on the fastening means.

With a prefetermined pivotable direction of the fastening means and with the actuator being prevented from swinging out in a radial direction, the fastening means rotates in the predetermined direction during its translational movement. The rear engagement member, which is frictionally or forcelockingly connected with the fastening means, rotates together with the fastening means The locking element, which is provided on the actuator, remains engaged in the matching engagement means provided on the fastening means during the translational movement of the fastening means, rotating the same.

The resilient actuator is formed as a resilient element. E.g. the locking resilient element can be formed, e.g., as a pointed element engageable in indentations or recesses which form a matching engagement element. The locking resilient element can be formed as an integral part of the actuator or as a separate part having other material characteristic than the actuator. Also, a pressure cylinder, e.g., a hydraulic or pneumatic cylindrical construction, or a cylinder subjected to action of a spring can be used.

The amount of rotation of the fastening means with respect to the initial position of the attachment system or of the rear engagement member depends essentially on the inclination of the actuator in its non-actuated position and its extent in the circumferential direction of the rotational movement. The actuator in its non-actuated position and its extent in the circumferential direction of the rotational movement,. The actuator preferably is so formed that the rear engagement member is already aligned for engaging from behind the holding projections of the hollow body before the fastening means reaches the limit of its displacement in the longitudinal direction, i.e., before it engages the upper or outer surface of the stop. Upon release of the fastening means, the fastening means is lifted relative to the stop by a spring force which is generated by the resilient actuator. With the fastening element being lifted, the rear engagement member engages the holding projections, pre-fixing the attachment system on the hollow body. Upon the subsequent application of pressure to the fastening means, the pre-fixation of the attachment system is released, and the system can further be displaced in the longitudinal direction in the mounting opening.

According to an embodiment of the invention, the transformation device comprises an annular element which is fixedly connected with the fastening means. The actuator is pivotable in a rotational direction of the fastening means and is held against displacement in a radial direction with respect to the fastening means. The actuator has, at its free end, locking means engageable in matching locking means provided on fastening means. The transformation device according to the embodiment functions identically to the transformation device described previously.

Advantageously, the transformation device included self-locking means for prevention the rotation of the fastening means in a direction opposite to a predetermined direction. The self-locking means preferably is formed as a resilient actuator arranged diametrically opposite the first actuator provided on the annular element. The self-locking means prevents rotation of the fastening means in the opposite direction when the pressure for displacing the fastening element and for rotating the same in the predetermined direction is removed. The fastening means can be lifted above the stop, but the undesirable rotation is prevented. Also, a hinge can be providede at the attachment point of the servo component and which is formed so that it enables a pivotable movement only in the predetermined direction. E.g., upon release of the actuator, the hinge would provide for pivotable movement in the predetermined direction but would block any opposite pivotal movement.

If a first actuator is formed as a cylindrical structure, it ban be so formed that it prevents rotation in the direction opposite the predetermined direction. Likewise, with a resilient actuator the hinge in the attachment region of the servo component to the annular element, as has already been mentioned, can be so formed that rotation or pivotal movement in a direction opposite the predermined direction is prevented. In this case, the self-locking of the transformation device can be achieved already with a single actuator.

The self-locking of the transformation device can be achieved with the use of more than two actuators. Preferable, an even number of resilient actuators is provided on the annular member which are arranged pairwise diametrically opposite each other. With the even number of actuators each servo component is provided with a hook-shaped locking element. When an odd number of actuators the locking element is formed as reverse hook, the rotation of the fastening means in the direction opposite the predetermined direction is reliably prevented.

Advantageously, the actuator is formed as a bent or helical element and is alighted radially inwardly relative to the longigudinal axis of the fastening means. With such actuator, tearing, e.g., an undesirable outward sliding of the actuator in a radial direction during actuation or movement of the fastening means is prevented to a most possible extent.

Advantageously, the fastening means includes or is formed as torque transmitting means which can have a shape similar to a hexagon which can be actuated with a conventional spanner.

Advantageously, the transformation device is formed by using a combined cutting and bending process. As a material for producing the transformation device, a plastic material, which meets corresponding requirements, can be used. Further, the transformation device or its parts can be formed of different materials. In the later case, by using different materials having different properties for manufacturing the transformation device, production costs can be reduced, and technical requirements optimized.

The novel features of the present invention, which are considered as characteristic for the invention, are set forth in the appended claims. The invention itself, however both as to its construction and its mode of operation, together with additional advantages and objects thereof, will be best understood. from the following detailed description of preferred embodiments, when read with reference to the accompanying drawings.

DETAILED DESCRIPTION OF THE PREFERRED EMBODIMENTS

Figure 1A:
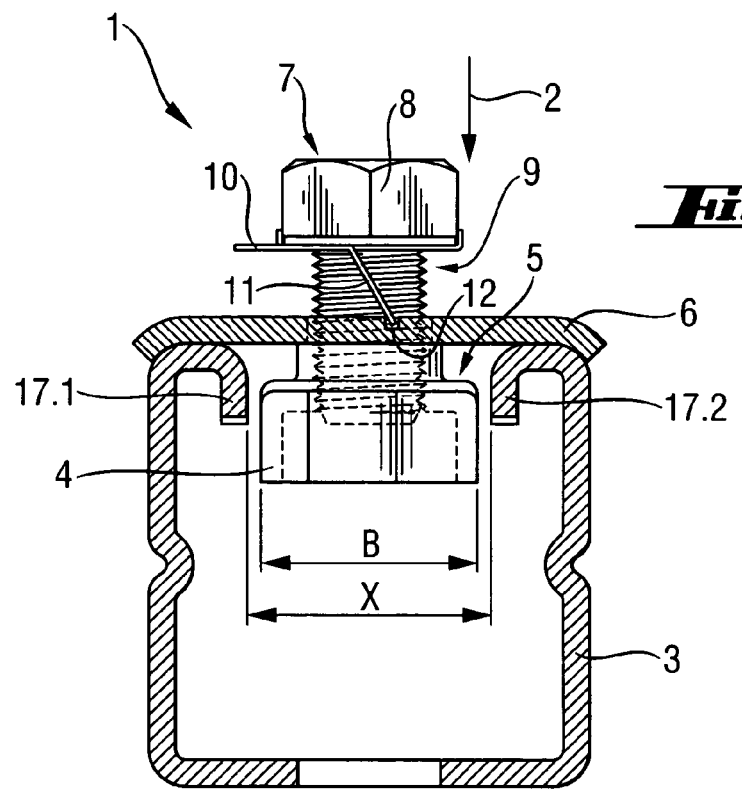
FIGS. 1a–1d a cross-sectional view of a first embodiment of an attachment system according to the present invention in four different positions during setting process of the attachment system.

FIG. 1a shows a cross-sectional view of the attachment system 1 according to the present invention as the system is inserted into a mounting rail and is displaced in the direction of arrow 2. The rear engagement member 4 is being inserted through a mounting opening 5 in the mounting rail 3. The rear engagement member 4 has a width B that is smaller than the distance X between holding projections 17.1 and 17.2 provided in the mounting rail 3. This insures that the rear engagement member 4 can be inserted through the mounting opening 5 which is formed by the holding projections 17.1 and 17.2. The distance Y between the rear engagement regions 18.1 and 18.2 (see FIG. 2*a*) of the rear engagement member 4 is greater than the distance X between the holding projections 17.1 and 17.2 to insure that the holding projections 17.1 and 17.2 would be engaged by the rear engagement member 4.

An end surface of the mounting rail 3 abuts against a stop 6. The attachment system 1 further includes a screw 7 that forms a fastening element and is forcelockingly connected with the rear engagement member 4. The screw 7 can be displaced through the stop 6 without being rotated. Between a screw head 8, which is formed as a torque transmitting element, and the stop 6, there is provided a transformation device 9 that includes an annular element 10, which is mounted on the screw head 8 for joint rotation and displacement therewith, and a resilient actuator 11. The actuator 11 engages in an indentation 12 provided on the stop 6 and formed as counterlocking means. Preferably, several indentations similar to the indentation 12 are provided on the surface of the stop 6, in which the actuator 11 can engage and be supported against. FIG. 1*a* shows the attachment system 1 in tis so-called displacing or insertion position.

Figure 2A:
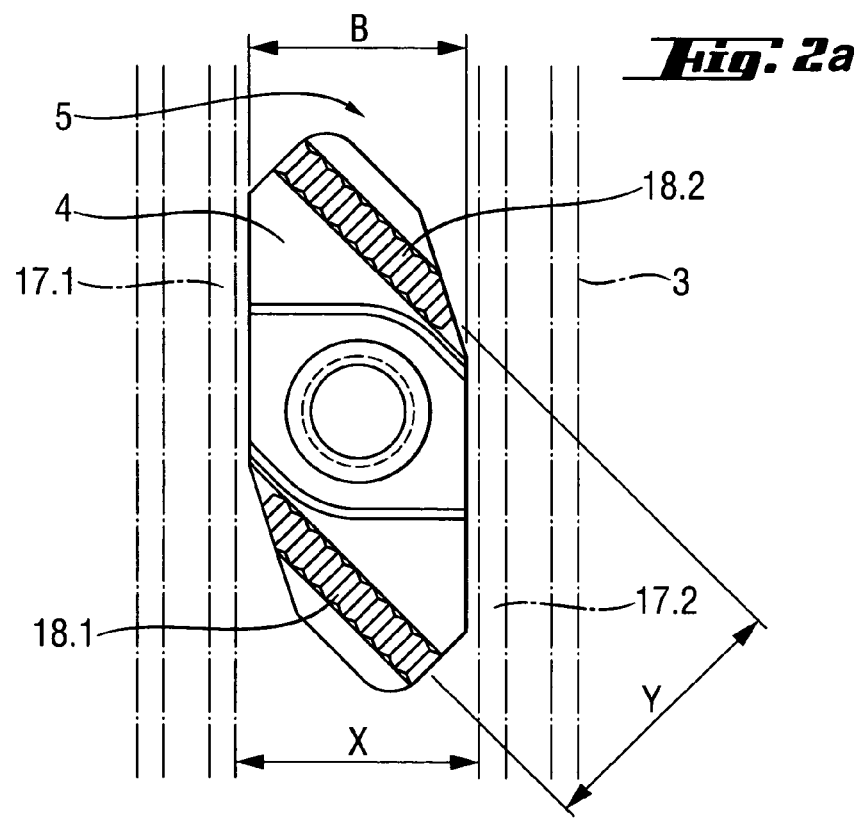
FIGS. 2a–2b a cross-sectional view showing the positions of the rear engagement member in positions of the attachment system shown in FIGS. 1a–1d, respectively.

FIG. 2*a* shows the position of the rear engagement member 4 with respect to the mounting rail 3 in the position of the attachment system 1 shown in FIG. 1*a*. For better understanding and representation, the mounting rail 3 is shown in FIG. 2*a*, as well as in FIGS. 2*c*–2*d*, with dot-dash lines.

Figure 1B:
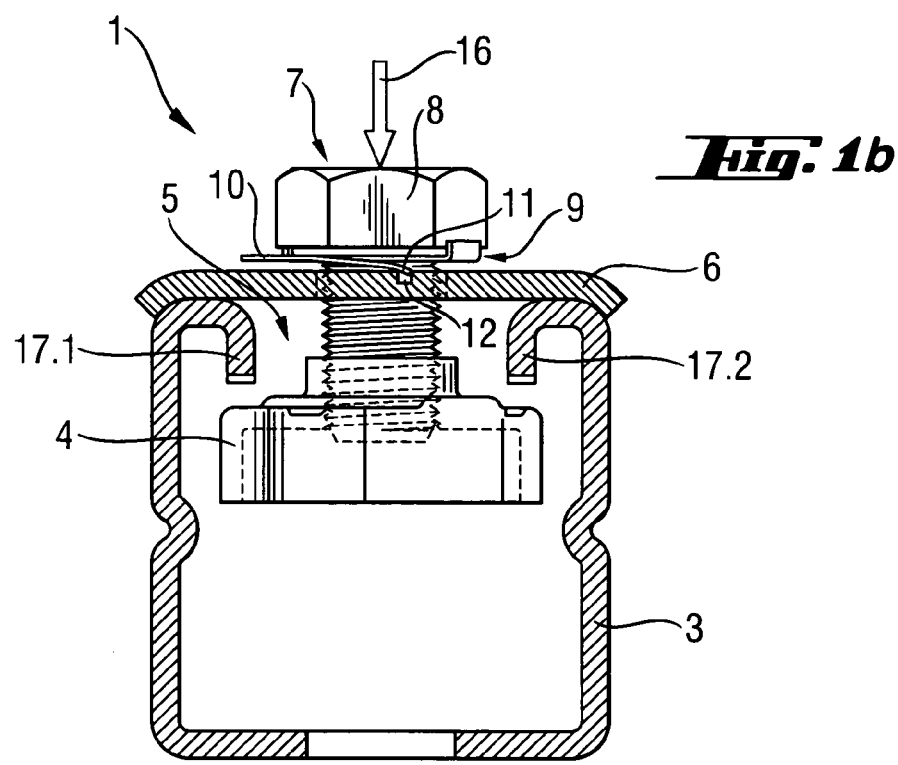
Figure 2B:
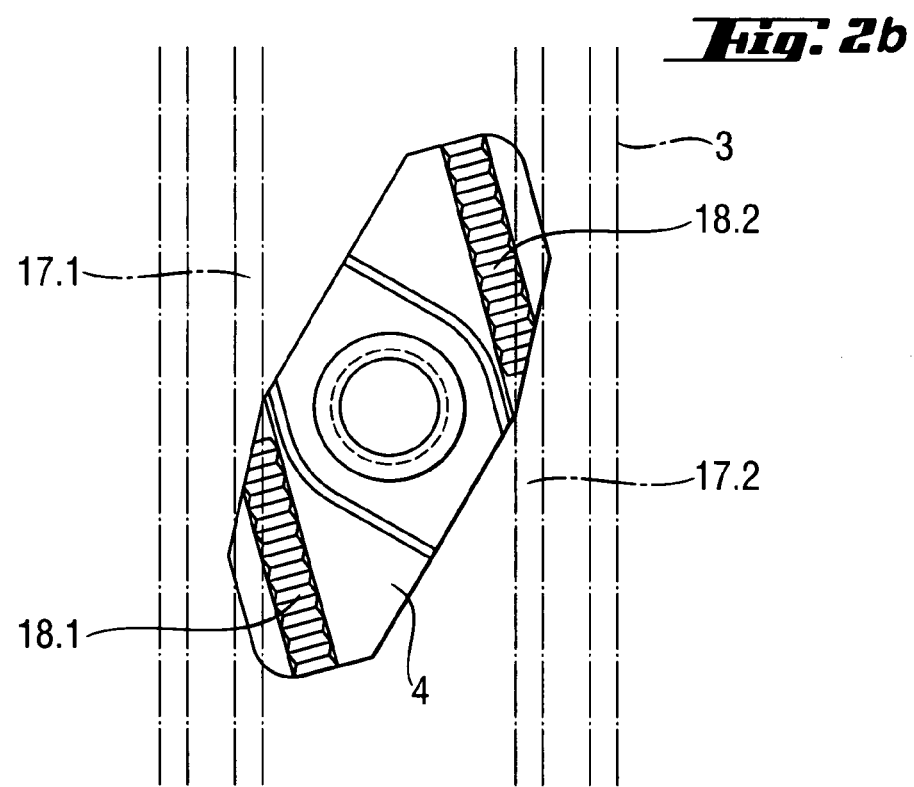

By pressing the screw 7 in the direction shown with arrow 16 (FIG. 1*c*) the rear engagement member 4 is lowered into the mounting rail 3 and then is rotated as shown in FIG. 1*e*. This reduces the distance between the screw head 8 and the stop 6. The travel path of the screw 7 should be adequate to insure the rotation of the rear engagement member 4 in the setting direction of the attachment system 1 into a position under the holding projections 17.1 and 17.2 of the mounting rail 3. During the displacement of the screw 7 in the direction shown with arrow 16, the transformation device 9 is compressed. Because the actuator 11 engages in the indentation 12, the screw 17 would be rotated in a predetermined direction, clockwise in the embodiment shown in FIGS. 1*a*–1*b* i.e., rightwardly. Because of the force-locking connection of the screw 7 with the rear engagement member 4, the engagement member 4 will also be rotated. As soon as the rotation of the real engagement member 4 is obstructed by the holding projections 17.1 and 17.2 the actuator 11 engages, as a result of the connection of the annular member 10 with the screw head 8, in an indentation on the upper surface of the stop 6 which follows the indentation 12, e.g., in the next following indentation. FIG. 2*b* shows the position of the rear engagement member 4 with respect to the holding projections 17.1 and 17.2 of the mounting rail 3.

Figure 1C:
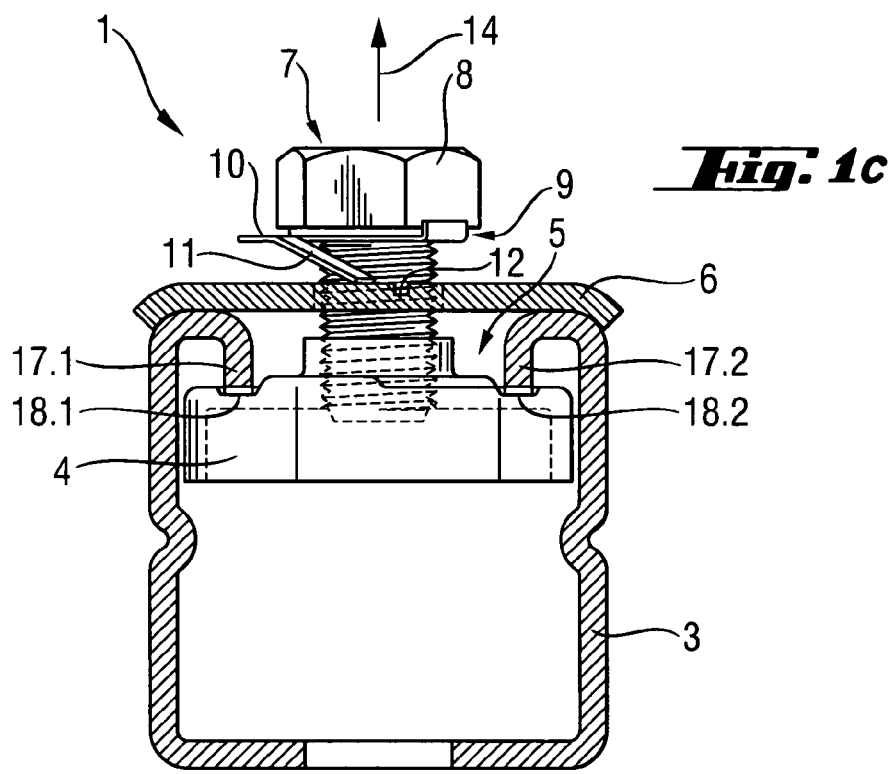

Upon further displacement of the screw head 8 of the screw 7, the rear engagement member becomes aligned for engagement with the holding projections 17.1, 17.2, as shown in FIG. 1*c*. The alignment of the rear engagement member 4 with respect to the holding projections 17.1, 17.2 is determined by a predetermined displacement path of the transformation device 9. Upon removal of pressure and because of the resiliency of the servo component 11, the screw 7 is lifted with respect to the stop 6 in the direction shown with arrow 14 until the rear engaging regions 18.1, 18.2 of the rear engagement member 4 engage the holding projections 17.1 and 17.2 of the mounting rail 3. The attachment system 1 is pre-secured on the mounting rail and occupies a so-called security position.

Figure 2C:
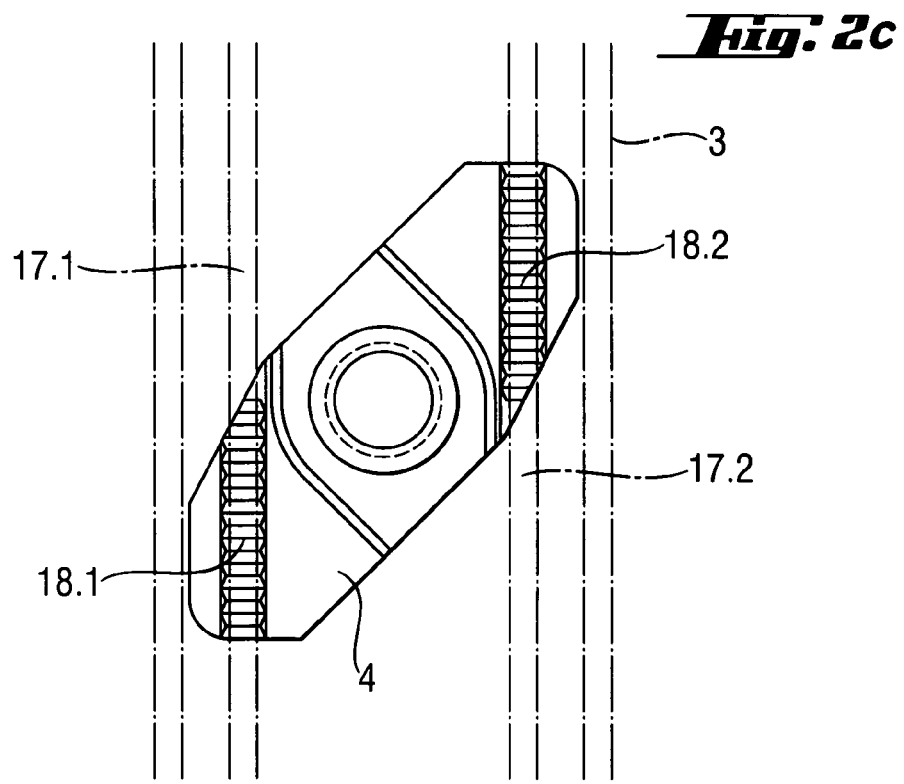
Figure 2D:
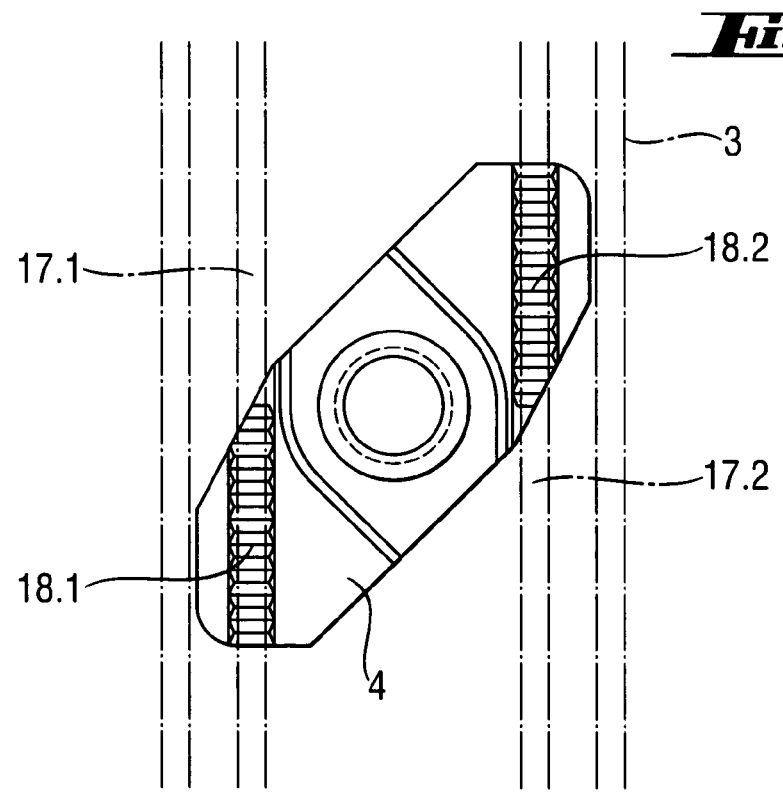

FIG. 2*c* shows a plan view showing the engagement the engaging regions 18.1, 18.2 of the rear engagement element 4 with the holding projections 17.1, 17.2 of the mounting rail 3. For a better engagement, the engaging regions 18.1, 18.2 are provided with knurlings. The free edges of the holding projections 17.1 and 17.2 are likewise provided with knurlings which cooperate with the knurlings of the engaging regions 18.1, 18.2 of the rear engagement member 4.

Figure 1D:
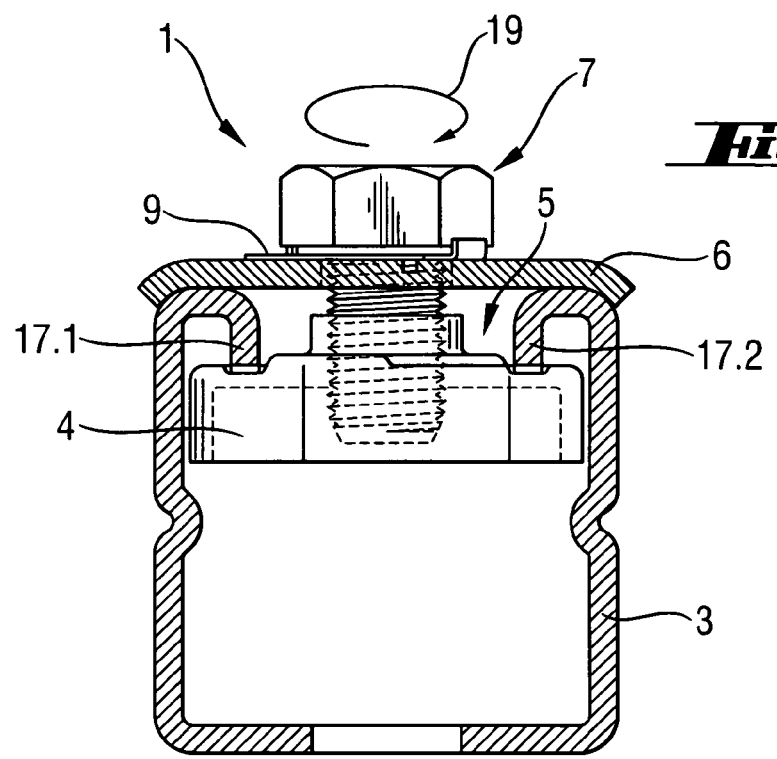

Upon application of pressure to the screw 7, pre-fixation between the rear engagement member 4 and the mounting rail 3 is released, and the attachment system can be displaced axially in the mounting opening 5 of the mounting rail 3. Upon the attachment system 1 reaching a predetermined position on the mounting rail 3, the rear engagement member 4 again engages the holding projections 17.1 and 17.2 of the mounting rail 3 from behind (beneath). The screw 7 is locked in its rotational direction shown with arrow 19 (see FIG. 1*d*), which results in a fixed connection of the rear engagement member 4 with the holding projections 17.1 and 17.2. As shown in FIGS. 2*a*–2*d*, the rear engagement member 4 always remains in a position, in which it is capable to engage from behind the holding projections 17.1 and 17.2 during positioning of the attachment system 1 and fixation of the screw 7, the undesirable rotation of the rear engagement member 4 relative to the mounting rail 3 being prevented by the transformation device 9.

Figure 4B:
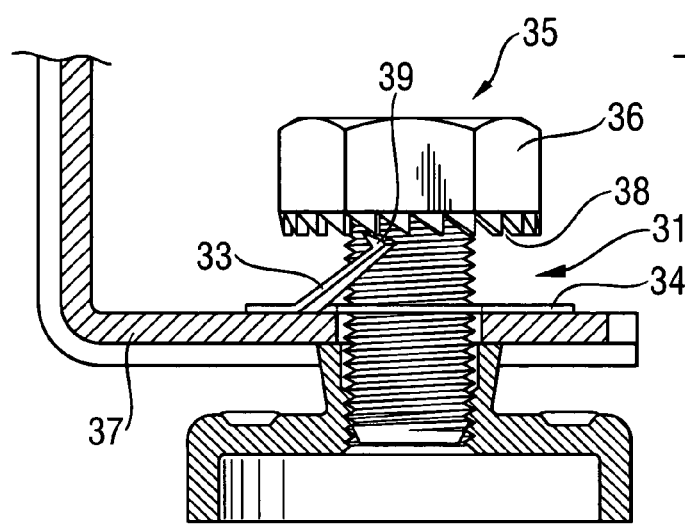
FIG. 4b a cross-sectional view along line IVb—IVb in FIG. 3.
Figure 3:
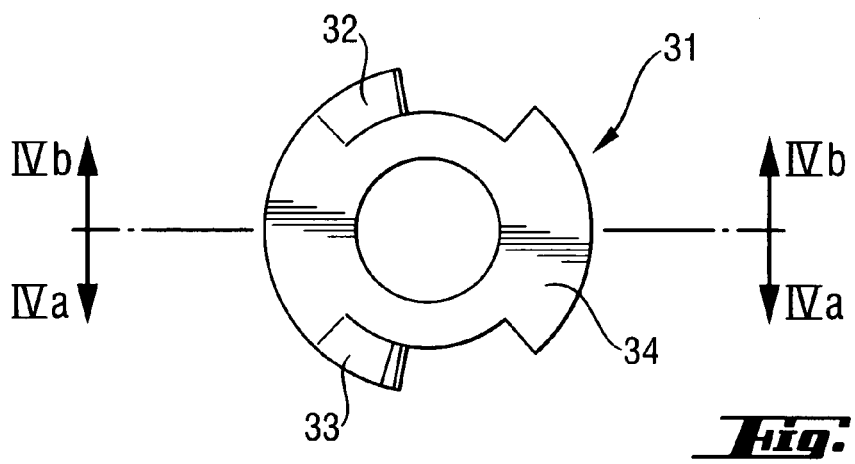
FIG. 3 a plan view of an annual member of a second embodiment of an attachment system according to the present invention.
Figure 4A:
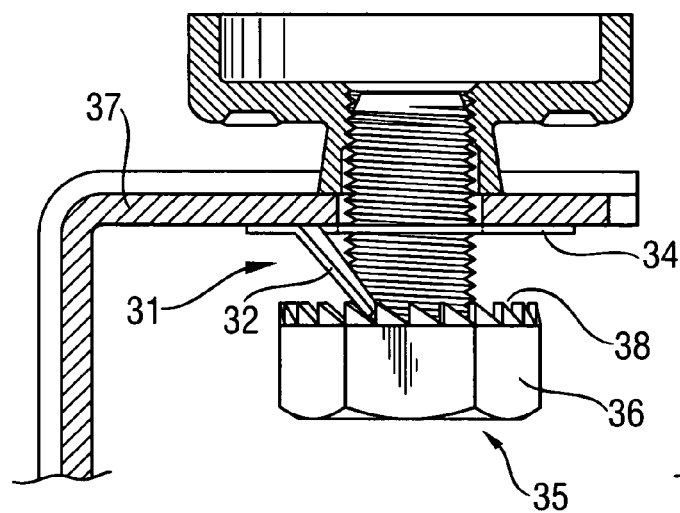
FIG. 4a a cross-sectional view along line IVa—IVa in FIG. 3.

FIGS. 3, 4*a*, 4*b* show another embodiment of the attachment system according to the present invention. The transformation device 31 includes an annular element 34 having a shape substantially similar to that of the washer for a screw. The annular element 34 is formed of sheet metal or a plastic material. The annular element 34 has two resilient servo components 32 and 33 provided thereon.

As shown in FIGS. 4*a* and 4*b*, the transformation device 31 is located between the rotation, torque, transmitting means, which is formed by a screw head 36 of a screw 35, and a stop 37, with the annular element 34 being glued on the stop 37, without a possibility of rotation relative thereto. On a surface of the screw head 36 facing the stop 37, there are provided a plurality of indentation 38 in which the servo components 32 and 33 can engage. As shows in FIG. 4*b*, the servo component 33 is provided at its free end with a reverse hook 39 forming the locking means. In this way, the transformation device 31 is equipped with self-locking means which prevents a reverse rotation of the screw 35 during setting of the attachment system.

In summary, the attachment system according to the present invention provides for pre-fixation of the system on a hollow body, without a need for the user to rotate the system or its parts by a predetermined angle. The displacement of the fastening element relative to the stop is sufficient to insure a correct positioning of the rear engagement member relative to the holding projections. In addition, the inventive attachment system can be economically produced.

Though the present invention was shown and described with references to the preferred embodiments, such as merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An attachment system to be introduced in a mounting opening (5) of a hollow body (3) having holding projections (17.1, 17.2), the attachment system comprising a rear engagement member (4) for engaging from behind the holding projection (17.1, 17.2) and insertable through the mounting opening (5) of the hollow body (3) in a first position thereof and displaceable in the hollow body (3) to a second position thereof for engaging the holding projection (17.1, 17.2); at least one stop (6; 37) for engaging edges of outer sides of the hollow body which limit the mounting opening (5); fastening means for connecting the stop (6; 37) with the rear engagement member (4) and a device providing for a relative rotational movement between the stop (6) and the rear engagement member (4) about an axis of the fastening means (7; 35), the relative rotation-providing device being formed as a transformation device (9; 31) for converting a translational movement of the fastening means (7; 35) relative to the stop (6) in a rotational movement of the rear engagement member (4) relative to the stop (6; 37) for displacing the rear engagement member (4) from the first position thereof to the second position thereof, wherein the transformational device (31) comprises an annular element (34) fixedly non-rotatably connected with the stop (37), wherein the actuator (32, 33) is pivotable in a rotational direction of the fastening means (35) and is held against displacement in a radial direction with respect to the axis of the fastening means, and wherein the actuator (32, 22) has, at a free end thereof, locking means engageable in matching locking means provided on the fastening means.

2. An attachment system according to claim 1, wherein the transformation device (31) comprises self-locking means for preventing rotation of the fastening means in an opposite direction.

3. An attachment system according to claim 1, wherein the fastening means forms torque transmitting means and is formed as a screw.

4. An attachment system according to claim 1, wherein the transformation device (9; 31) is formed of a sheet metal by a combined cutting and bending process.

5. An attachment system to be introduced in a mounting opening (5) of a hollow body (3) having holding projections (17.1, 17.2), the attachment system comprising a rear engagement member (4) for engaging from behind the holding projection (17.1, 17.2) and insertable through the mounting opening (5) of the hollow body (3) in a first position thereof and displaceable in the hollow body (3) to a second position thereof for engaging the holding projection (17.1, 17.2); at least one stop (6; 37) for engaging edges of outer sides of the hollow body which limit the mounting opening (5); fastening means for connecting the stop (6; 37) with the rear engagement member (4) and a device providing for a relative rotational movement between the stop (6) and the rear engagement member (4) about an axis of the fastening means (7; 35), the relative rotation-providing device being formed as a transformation device (9; 31) for converting a translational movement of the fastening means (7; 35) relative to the stop (6) in a rotational movement of the rear engagement member (4) relative to the stop (6; 37) for displacing the rear engagement member (4) from the first position thereof to the second position thereof, wherein the transformational device (9) comprises an annular element (10) fixedly non-rotatably connected with fastening means (7) and including a resilient actuator (11), wherein the actuator is pivotable in a rotational direction of the fastening means(7) and is held against displacement in a radial direction with respect to the fastening means, wherein the actuator (11) has, at a free end thereof, locking means engageable in matching locking means provided on the stop (6), and wherein the actuator (11) is formed as a helical element and is aligned radially inwardly relative to a longitudinal axis of the fastening means (7).

* * * * *